(12) United States Patent
Lendre et al.

(10) Patent No.: US 6,925,139 B2
(45) Date of Patent: Aug. 2, 2005

(54) MICROPROCESSOR COMPRISING A SELF-CALIBRATED TIME BASE CIRCUIT

(75) Inventors: Sandrine Lendre, Aix en Provence (FR); Franck Roche, Trets (FR); Olivier Plourde, Aix en Provence (FR)

(73) Assignee: STMicroelectronics S.A., Montrouge (FR)

( * ) Notice: Subject to any disclaimer, the term of this patent is extended or adjusted under 35 U.S.C. 154(b) by 8 days.

(21) Appl. No.: 10/758,680

(22) Filed: Jan. 15, 2004

(65) Prior Publication Data

US 2004/0174945 A1 Sep. 9, 2004

(30) Foreign Application Priority Data

Jan. 16, 2003 (FR) ............................................ 03 00442

(51) Int. Cl.[7] ................................................ G07C 3/00
(52) U.S. Cl. ........................... 377/16; 377/44; 327/146; 327/151; 327/293
(58) Field of Search ...................... 377/16, 44; 327/146, 327/151, 293

(56) References Cited

U.S. PATENT DOCUMENTS 5,483,185 A * 1/1996 Scriber et al. ................. 327/99

5,631,853 A 5/1997 Miller et al. ................. 364/569

FOREIGN PATENT DOCUMENTS

EP 0 246 120 A2 11/1987
EP 0 316 943 A2 5/1989

* cited by examiner

*Primary Examiner*—Margaret R. Wambach
(74) *Attorney, Agent, or Firm*—Lisa K. Jorgenson; David V. Carlson; Seed IP Law Group PLLC

(57) ABSTRACT

The present invention relates to an integrated circuit comprising a first clock circuit delivering a first clock signal, a second clock circuit delivering a second clock signal, a first counting circuit for delivering a time base signal using a clock signal and a counting value, and means for applying the first clock signal and a first counting value to the first counting circuit, so as to produce a first time base signal. According to the present invention, the integrated circuit comprises means for producing a second time base signal using the second clock signal and a second counting value, and means for calibrating the second counting value such that it is equal or proportional to the number of periods of the second clock signal occurring during a determined time interval equal to a period or to a whole number of periods of the first time base signal. Application particularly to the management of a timer in a microprocessor.

19 Claims, 4 Drawing Sheets

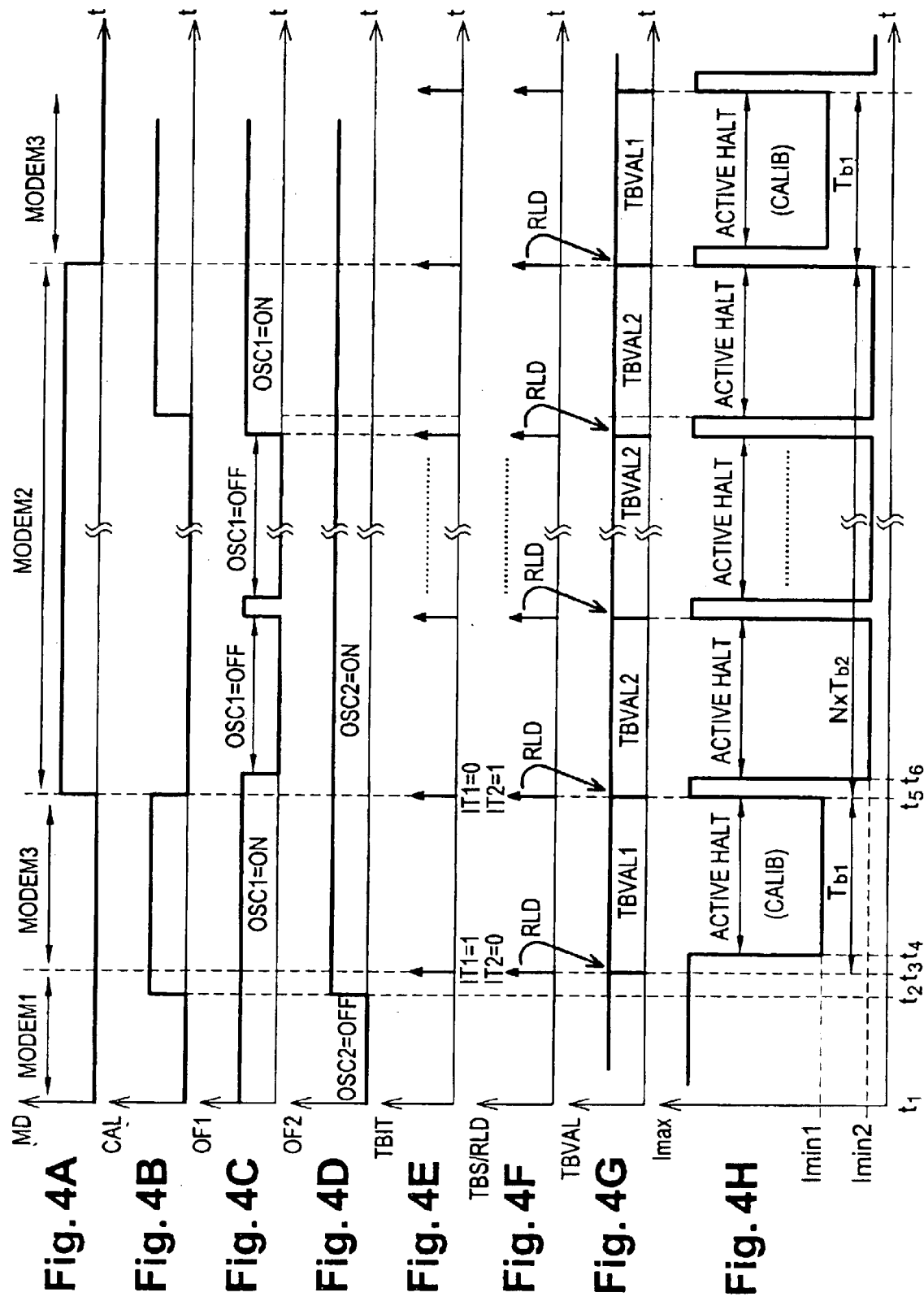

MICROPROCESSOR COMPRISING A SELF-CALIBRATED TIME BASE CIRCUIT

FIELD OF THE INVENTION

The present invention relates to integrated circuits, particularly microprocessors or microcontrollers, comprising a time base signal generating device.

BACKGROUND OF THE INVENTION

Time base signals are used extensively in integrated circuits for timing processes, particularly in microprocessors or microcontrollers.

As an example, FIG. 1 very schematically represents the architecture of a microprocessor MP1 comprising a classical time base circuit TBCT1 of the type described in document FR 2 789 501.

The microprocessor comprises a central processing unit or CPU, a program memory MEM, and a data bus DBUS linking the CPU and the memory MEM. The CPU is timed by a primary clock signal H1 supplied by a clock circuit CKGEN comprising a precision oscillator OSC1, such as a quartz oscillator, and a frequency divider PSC ("prescaler"). The oscillator OSC1 delivers a clock signal H0 applied to the divider PSC the output of which delivers the primary clock signal H1.

The time base circuit TBCT1 comprises a programmable countdown counter DCNT timed by the clock signal H1. The countdown counter DCNT is linked to a set point register TBREG at least write accessible by means of the data bus DBUS, in which a time base counting value TBVAL is recorded.

The countdown counter DCNT comprises an output OUTZ that delivers a time base signal TBS having a pulse of determined value (0 or 1) upon each change to zero of the countdown counter DCNT. The pulse of the time base signal TBS is applied to the countdown counter DCNT as a signal RLD ("RELOAD") for loading-the value TBVAL present in the countdown counter DCNT. Therefore, the countdown counter DCNT automatically loads the value TBVAL at the end of each counting cycle and the time base signal TBS has periodic pulses of period Tb equal to T1*TBVAL, T1 being the period of the clock signal H1.

The signal TBS is applied to an interrupt decoder ITDEC that supplies the CPU with an interrupt signal TBIT at each pulse of the signal TBS. The period of the interrupt signals TBIT is therefore equal to the period Tb of the pulses of the time base signal, if the interrupt signal is not masked.

Various applications of this time base signal may be made.

The CPU can for example be put into an active halt state ("Active Halt Mode") between two pulses of the time base signal TBS. This active halt mode results in the fact that various current-consuming peripheral circuits are stopped, except for the clock circuit CKGEN and the countdown counter DCNT. The CPU is reactivated when the pulse of the time base signal TBS is emitted.

In addition to the management of an active halt mode, the time base signal TBS also allows a real time clock or timer (not represented) to be managed that is incremented upon each pulse of the signal TBS. The value TBVAL is for example chosen so that the period Tb of the time base signal is equal to one second or to a fraction of a second.

In one known proposed, but rejected design of the microprocessor MP1, the circuit TBCT1 is driven by a secondary oscillator OSC2 delivering a clock signal H2, represented in dotted lines in FIG. 1. In this case, the clock signal H2 is applied to the clock input of the countdown counter DCNT instead of the clock signal H1. This solution is considered in the above-mentioned document FR 2 789 501, but it is not chosen on the grounds that providing the second oscillator OSC2 occupies a considerable surface area of silicon and increases the cost price of the microprocessor.

BRIEF SUMMARY OF THE INVENTION

The present invention is based on the previously rejected premise according to which providing this second oscillator OSC2 to control the time base signal TBS can, on the contrary, be advantageous.

Indeed, the clock circuit CKGEN generally has a high frequency in the order of a few Megahertz and a considerable current consumption due, primarily, to the consumption of the oscillator OSC1 and, secondly, to that of the divider circuit PSC (that varies according to the frequency). Thus, the residual consumption of the microprocessor in the active halt mode, although reduced by the stopping of the peripheral elements, nonetheless remains considerable.

Furthermore, oscillators having a low cost price and low current consumption are known, such as RC oscillators (resonant circuit RC used as an oscillator), that can be integrated at lesser cost onto a silicon wafer to produce the oscillator OSC2.

Therefore, the idea of the present invention is that an oscillator OSC2 operating at a low frequency of some tens to some hundreds of Kilohertz, can prove to be sufficient to control the period Tb of the time base signal TBS, and could allow the main clock circuit CKGEN to be stopped during periods of active halt.

However, the oscillation frequency of an oscillator OSC2 of the above-mentioned type is generally not very precise and can, in particular, have, at the output of a manufacturing line of integrated circuits, excessive variations in the order of more than 400% between two integrated circuits. It is also subject to substantial variations according to the operating conditions such as the temperature and the supply voltage of the integrated circuit.

Thus, one object of the present invention is to provide an integrated circuit comprising a time base circuit timed by a clock signal that is not very precise but that outputs a precise time base signal.

Another object of the present invention is to provide an integrated circuit having a minimum current consumption during periods of active halt.

These objects are achieved by providing an integrated circuit comprising a first clock circuit delivering a first clock signal, a second clock circuit delivering a second clock signal, a first counting circuit for delivering a time base signal using a clock signal and a counting value, and means for applying the first clock signal and a first counting value to the first counting circuit, so as to produce a first time base signal, further comprising means for calculating a second counting value equal or proportional to the number of periods of the second clock signal occurring during a determined time interval equal to a period or to a whole number of periods of the first time base signal, and means for producing a second time base signal using the second clock signal and the second counting value.

According to one embodiment, the means for calculating the second counting value comprise a second counting circuit and means for applying the second clock signal to the second counting circuit during a determined time interval equal to a period or a whole number of periods of the first time base signal.

According to one embodiment, the means for producing a second time base signal comprise the first counting circuit, and means for applying the second counting value and the second clock signal to the first counting circuit, such that the first counting circuit produces the second time base signal.

According to one embodiment, the first counting circuit is linked to a set point register receiving a counting value, and is arranged for automatically loading, at the end of a counting cycle of a counting value, the counting value present in the set point register.

According to one embodiment, the integrated circuit comprises means for loading the second counting value into the set point register during the counting of the first counting value by the first counting circuit.

According to one embodiment, the means for calculating the second counting value comprise a second counting circuit that is integrated into the set point register, and means for applying the second clock signal to the second counting circuit during a determined time interval equal to a period or a whole number of periods of the first time base signal, such that the second counting value is present in the set point register when the first counting circuit completes a counting cycle of the first counting value.

According to one embodiment, the first counting circuit is a countdown counter.

According to one embodiment, the integrated circuit comprises a multiplexer circuit for applying the first or the second clock signal to the first counting circuit.

According to one embodiment, the time base signal supplied by the first counting circuit is applied to an interrupt decoder.

According to one embodiment, the integrated circuit comprises a timer that is updated in real time sometimes in synchronisation with the first time base signal and other times in synchronisation with the second time base signal.

According to one embodiment, the integrated circuit comprises an active halt mode during which certain elements of the integrated circuit are deactivated, the duration of which is sometimes controlled by the first time base signal and other times by the second time base signal.

According to one embodiment, the integrated circuit comprises means for deactivating the first clock circuit while the second time base signal is produced.

According to one embodiment, the first and the second clock circuits each comprise an oscillator, and the oscillator of the second clock circuit features reduced current consumption and low precision relative to the oscillator of the first clock circuit.

According to one embodiment, the integrated circuit comprises means for performing the following operations cyclically: producing the first time base signal by means of the first counting circuit, by applying the first clock signal and the first counting value to the first counting circuit, calibrating the second counting value while the first counting circuit is supplying the first time base signal, then producing the second time base signal by means of the first counting circuit, by applying the second clock signal and the second counting value to the first counting circuit.

According to one embodiment, the integrated circuit comprises a microprocessor central processing unit for driving the means for calculating the second counting value.

According to one embodiment, the integrated circuit comprises: a second counting circuit for calculating the second counting value, a control register comprising a calibration bit (CAL), and a logic circuit for applying the second clock signal to the second counting circuit during a determined time interval equal to a period or a whole number of periods of the first time base signal, when the calibration bit has a determined value.

According to one embodiment, the integrated circuit comprises means for applying the first or the second clock signal to the first counting circuit depending on the value of a mode bit present in the control register.

BRIEF DESCRIPTION OF THE DRAWINGS

These and other objects, features and advantages of the present invention will be explained in greater detail in the following description of examples of embodiments of a time base circuit according to the present invention implemented in a microprocessor, given as an example in relation with, but not limited to, the following figures:

FIGS. 4A to 4G are timing diagrams of logic signals showing the operation of the time base circuit according to the present invention and its use for managing an active halt mode, and FIG. 4H is a current curve showing the current consumption of the microprocessor according to the present invention, when the latter has periods of active halt.

DETAILED DESCRIPTION OF THE INVENTION

Figure 1:
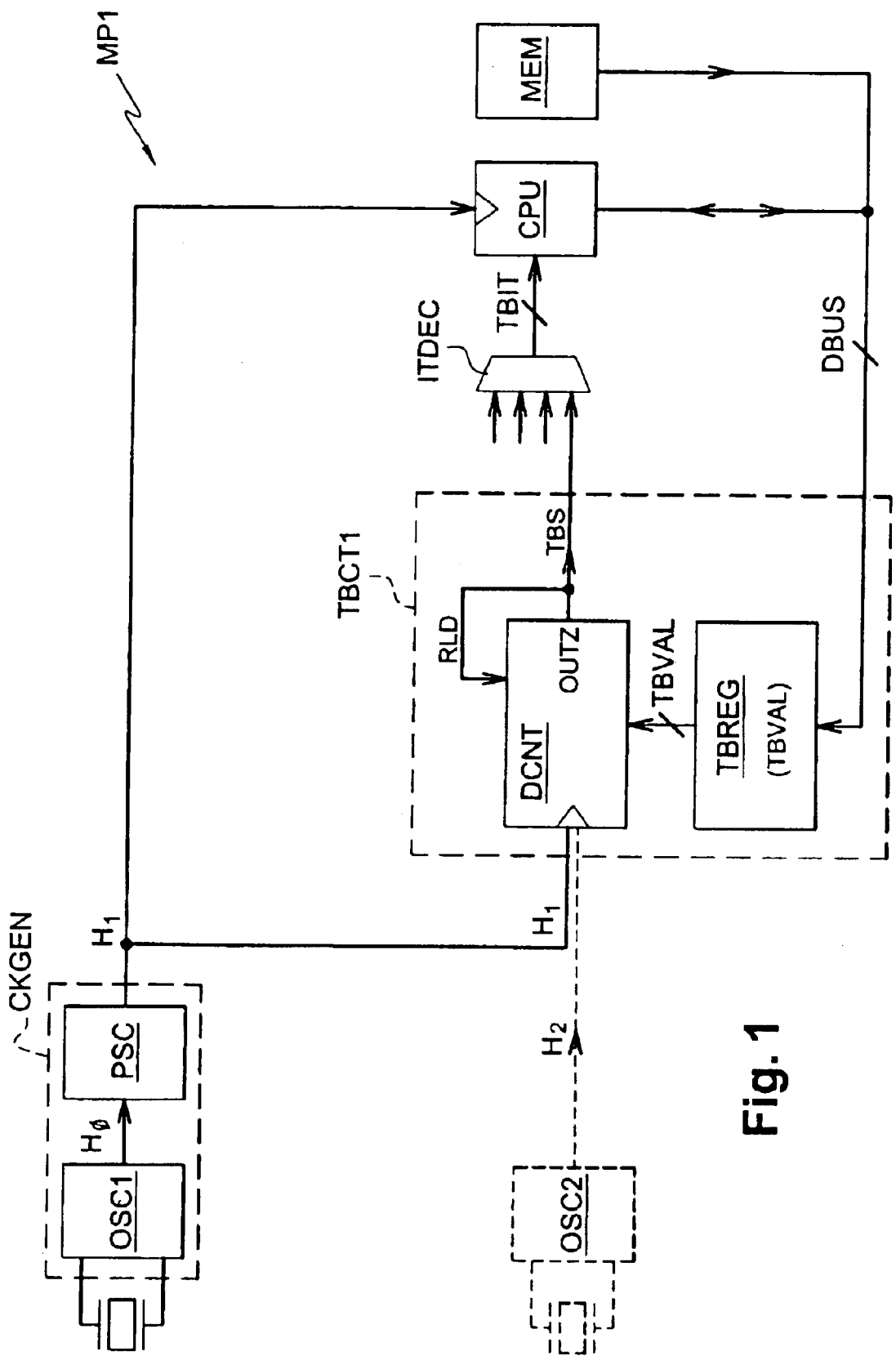
FIG. 1 described above schematically represents in block form a microprocessor comprising a classical time base circuit of the prior art, FIG. 2 schematically represents in block form a microprocessor comprising a time base circuit according to the present invention.
Figure 2:
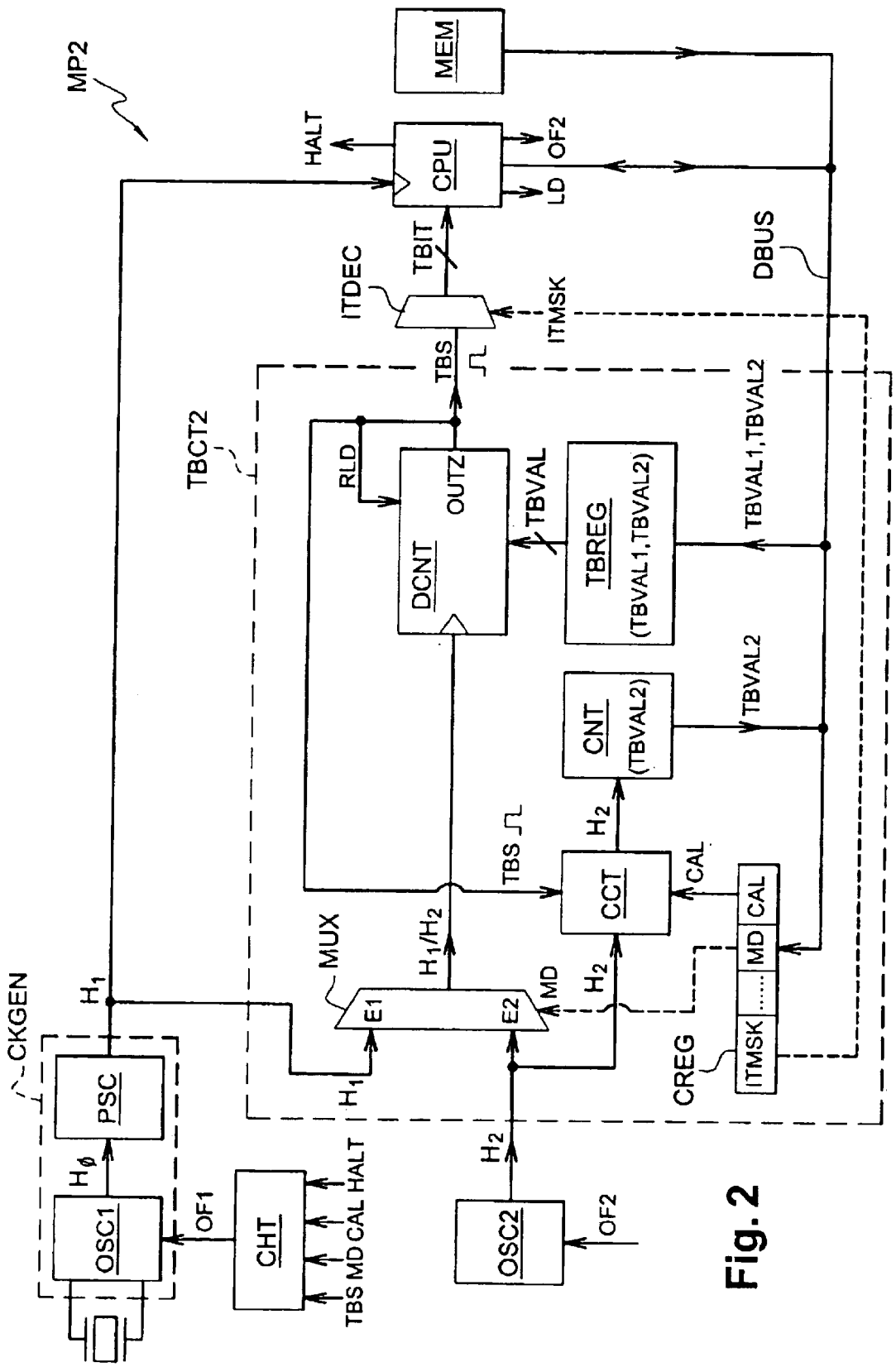

FIG. 2 schematically represents the architecture of a microprocessor MP2 comprising a time base circuit TBCT2 according to the present invention.

The microprocessor MP2 comprises, like the classical microprocessor MP1 described above, a central processing unit or CPU, a program memory MEM, a data bus DBUS linking the CPU to the memory MEM, an interrupt decoder ITDEC and a clock circuit CKGEN delivering a primary clock signal H1 applied to the CPU. The clock circuit CKGEN classically comprises a quartz oscillator OSC1 delivering a signal H0 of frequency F0, which is applied to a divider PSC to obtain the clock signal H1, the frequency F1 of which is in the order of a few Megahertz, generally from 1 to 8 MHz. The microprocessor also comprises an oscillator OSC2 delivering a clock signal H2. The oscillator OSC2 is an oscillator with low current consumption, such as an oscillator RC, having an oscillation frequency F2 in the order of a few kilohertz to a few hundred kilohertz for example. As stated above, the frequency F2 of this oscillator is not very precise and cannot be used as such to produce a time base signal. Therefore, the resonance frequency of an oscillator RC provided to be in the order of 120 kHz, can fluctuate from 60 kHz to 260 kHz between two integrated circuits produced in the same manufacturing line.

The oscillator OSC1 is controlled by an ON/OFF signal OF1 and the oscillator OSC2 controlled by an ON/OFF signal OF2.

The time base circuit TBCT2 comprises, like the time base circuit TBCT1 described above, a countdown counter DCNT and a set point register TBREG at least write accessible by means of the data bus DBUS. The countdown counter DCNT has an output OUTZ supplying a time base signal TBS, that has for example a pulse on 1 at each change to zero of the countdown counter DCNT. The signal TBS is applied to the interrupt decoder ITDEC that supplies an interrupt signal TBIT upon each pulse of the signal TBS. The signal TBS is also applied to the countdown counter DCNT as a signal RLD for loading a counting value present in the register TBREG. Therefore, after each countdown cycle, the countdown counter DCNT automatically loads the counting value present in the register TBREG.

According to the present invention, the circuit TBCT2 further comprises a multiplexer circuit MUX, a counter CNT, a control register CREG and a hard-wired logic control circuit CCT.

The counter CNT is at least read accessible by means of the data bus DBUS. The control register CREG is at least write accessible by means of the data bus DBUS, and comprises flags ITMSK, MD, CAL. The flag ITMSK is applied to the interrupt decoder ITDEC and allows, if so desired, the interruption TBIT to be masked.

The multiplexer MUX receives the clock signal H1 at a data input E1, the clock signal H2 at a data input E2 and the flag MD at a control input. Its output is applied to a clock input of the countdown counter DCNT and supplies one of the clock signals H1, H2 depending on the value of the flag MD.

The control circuit CCT receives the flag CAL, the time base signal TBS, and the clock signal H2 at input. The control circuit CCT transmits the clock signal H2 to a clock input of the counter CNT during a calibration phase described below.

The time base circuit TBCT2 has three operating modes, respectively M1, M2, M3.

In the operating mode M1, the flags MD and CAL are on 0 and the output of the circuit MUX delivers the clock signal H1. A counting value TBVAL1 is loaded into the register TBREG. The countdown counter DCNT delivers a time base signal of period Tb1 equal to T1*TBVAL1. The circuit TBCT2 therefore operates like the classical circuit TBCT1 described above, and delivers a first time base signal TBS1 the period of which Tb1 varies according to the clock signal H1 and the counting value TBVAL1. The period Tb1 is therefore equal to:

$$Tb1 = T1 * TBVAL1 \quad (1)$$

T1 being the period of the signal H1.

In the operating mode M2, the flag MD is on 1 and the flag CAL is on 0. The output of the multiplexer circuit MUX delivers the clock signal H2. A counting value TBVAL2 is loaded into the register TBREG. The countdown counter DCNT delivers a second time base signal TBS2 the period Tb2 of which therefore varies according to the clock signal H2 and the value TBVAL2. The period Tb2 is therefore equal to:

$$Tb2 = T2 * TBVAL2 \quad (2)$$

T2 being the period of the signal H2.

The operating mode M3 allows a calibration phase to be implemented during which the counting value TBVAL2 is calibrated with reference to the first clock signal H1. The switch into the mode M3 is prepared by the CPU while the circuit TBCT2 is in one of the other two modes M1, M2. The flag CAL is set to 1 and the flag MD is set to 0 (or left on 0). The counting value TBVAL1 is loaded into the register TBREG if it is not present there.

The switch into the mode M3 occurs on the first pulse of the time base signal TBS1 occurring after the flag CAL has been set to 1. The countdown counter loads the value TBVAL1 present in the register TBREG while the counter CNT is set to zero by the control circuit CCT. Then, the circuit CCT applies the clock signal H2 to the counter CNT until the occurrence of the next time base pulse. The time interval during which the counter CNT receives the clock signal H2 is therefore equal to TBVAL1*T1 and corresponds to the period Tb1 of the time base signal TBS1. When this time interval has elapsed, the counter CNT has a counting value TBVAL2 equal to:

$$TBVAL2 \cong TBVAL1 * T1/T2 \quad (3)$$

with a precision P reaching a better value than the ratio of the period T2 of the signal H2 to the duration Tb1 of the first time base signal TBS1, i.e.:

$$P < T2/Tb1$$

Once the calibration phase M3 is ended, the CPU reads the calibrated counting value TBVAL2 present in the counter CNT and copies it in the register TBREG, while the latter is ending a new countdown cycle of the value TBVAL1. When the countdown cycle is ended and the interrupt signal TBIT is applied to the CPU, the CPU causes the circuit TBCT2 to switch into the mode M2 by setting the flag MD to 1 and by putting the flag CAL to 0. The counter DCNT then loads the value TBVAL2 present in the register TBREG and receives the clock signal H2, such that the circuit TBCT2 delivers the second time base signal TBS2. By combining the relations (2) and (3), the period Tb2 of the second time base signal is equal to:

$$Tb2 \cong T2 * (TBVAL1 * T1/T2) \quad (4)$$

i.e.:

$$Tb2 \cong TBVAL1 * T1 \quad (5)$$

Therefore, by using the present invention, the second time base signal TBS2 has a period Tb2 that is equal to the period Tb1 of the first time base signal TBS1 and benefits from the precision offered by the oscillator OSC1, while being produced using the clock signal H2 delivered by the auxiliary oscillator OSC2. The calibration method according to the present invention allows the imprecision on the frequency F2 existing at the output of a manufacturing line to be offset. It can be repeated cyclically in a way described below, so as to offset the drifts in the frequency F2 due to changes occurring in the conditions of operation of the microprocessor, such as variations in temperature or supply voltage for example.

Figure 3:
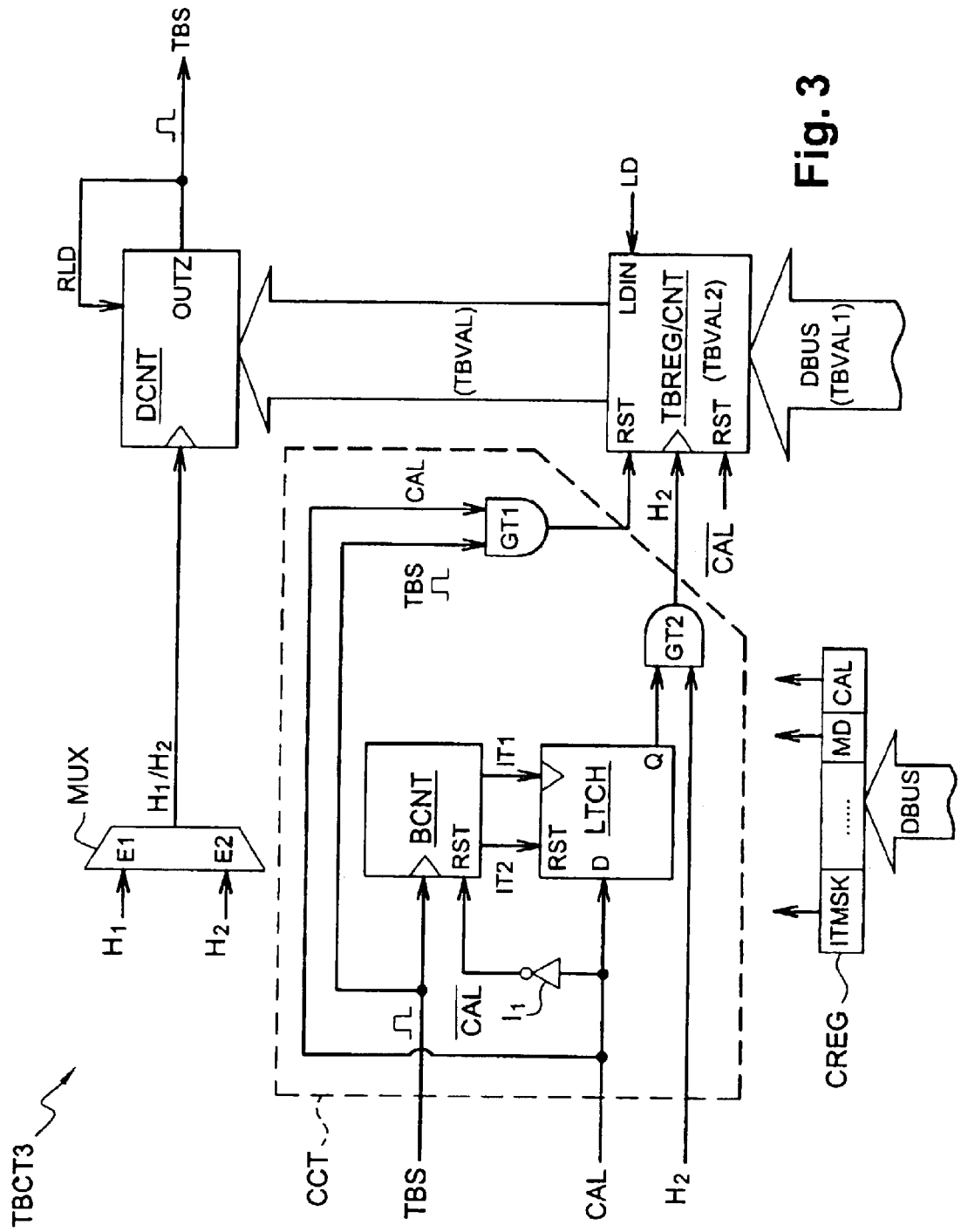
FIG. 3 is a more detailed diagram of one particular embodiment of a time base circuit according to the present invention.

FIG. 3 represents one embodiment TBCT3 of the time base circuit according to the present invention, in which the counter CNT is integrated into the set point register TBREG of the countdown counter DCNT. The advantage of this embodiment is that the calibrated counting value TBVAL2 is located in the register TBREG at the end of the calibration phase M3, and does not have to be transferred into this register via the data bus. The switch from the mode M3 to the mode M2 can then be immediate and occur at the end of the calibration phase.

FIG. 3 also represents an example of an embodiment of the control circuit CCT. The circuit CCT comprises a binary counter BCNT, a latch LTCH, an inverting gate I1 and two AND gates GT1, GT2. The counter BCNT is a counter by four having two output bits, respectively one least significant bit IT1 and one most significant bit IT2. The counter BCNT has a clock input receiving the time base signal TBS taken off at the output of the countdown counter DCNT, and a reset input RST receiving a signal/CAL delivered by the inverting gate I1, which receives the flag CAL at its input. The latch LTCH is here a flip-flop D that has a reset input RST receiving the bit IT2, a clock input receiving the bit IT1, an input D receiving the flag CAL and an output Q linked to one input of the gate GT2. The gate GT2 receives the clock signal H2 at a second input and its output is linked to the clock input of the counter CNT. The gate GT1 receives the signal TBS and the flag CAL at input, and its output is applied to a reset input RST of the counter CNT. Finally, the register TBREG, that is here merged with the counter CNT, has a load input LDIN receiving a signal LD delivered by the CPU when the counting value TBVAL1 must be loaded.

Like the circuit TBCT2, the circuit TBCT3 switches into the operating mode M3 upon the first pulse of the time base signal TBS1 occurring after the flag CAL has been set to 1. This first pulse increments the counter BCNT and sets the counter CNT to zero, via the gate GT1. The bit IT1 changes to 1 and activates the latch LTCH. The output Q of the latch copies the value of the flag CAL present at the input D and changes to 1. The gate GT2 then authorises the application of the clock signal H2 to the clock input of the counter CNT, and the latter starts to count the pulses of the clock signal H2.

The occurrence of a second pulse of the time base signal TBS1 leads to a new increment of the counter BCNT, such that the bit IT2 changes to 1 while the bit IT1 changes back to 0. The change to 1 of the bit IT2 sets the latch LTCH back to zero, such that its output Q changes back to 0 and the gate GT2 no longer allows the clock signal H2 to pass. The counter CNT thus stops counting the pulses of the clock signal H2 and the counting stops-on a value of TBVAL2 that here corresponds to the number of periods of the clock signal H2 that occurred during a time interval equal to the period Tb1 of the first time base signal TBS1.

The occurrence of the second pulse of the time base signal TBS1 thus marks the end of the calibration phase, and also causes the application of an interrupt signal TBIT to the CPU. The latter then sets the flag CAL to 0 and the flag MD to 1 so as to cause the circuit TBCT3 to switch into the mode M2. The change to 0 of the flag CAL causes the counter BCNT to be reset, on a rising edge of the signal/CAL.

The occurrence of the second pulse of the time base signal TBS1 also corresponds to the application of a reload pulse RLD to the countdown counter DCNT. As the counter CNT is here integrated into the set point register TBREG, the calibrated counting value TBVAL2 is therefore transferred automatically and immediately to the countdown counter DCNT at the end of the calibration phase.

An example of an application of the present invention will now be described in which the CPU goes into the active halt mode between two pulses of the time base signal TBS, by executing an instruction "ACTIVE HALT".

According to one advantageous aspect of the present invention, the main oscillator OSC1 is stopped during the periods of active halt of the CPU. More particularly, the oscillator OSC1 is stopped by setting the signal OF1 to 0 when the circuit TBCT2 is in the mode M2 and the CPU has received the instruction "ACTIVE HALT".

The oscillator OSC1 is stopped here by a hard-wired logic control circuit CHT, represented in block form in FIG. 2. This circuit CHT receives at input the flags MD and CAL, the time base signal TBS and a halt signal HALT emitted by the CPU when it executes the instruction "ACTIVE HALT". The circuit CHT sets the signal OF1 to 0 upon receiving the signal HALT if and only if the flag MD is on 1 and the flag CAL is on 0, and automatically sets it back to 1 upon receiving a pulse of the time base signal TBS.

FIGS. 4A to 4G are timing diagrams respectively representing the flag MD, the flag CAL, the ON/OFF signal OF1 of the oscillator OSC1, the ON/OFF signal OF2 of the oscillator OSC2, the interrupt signal TBIT, the time base signal TBS the pulses of which form the reload signal RLD of the countdown counter DCNT, and the value TBVAL loaded by the countdown counter DCNT after each countdown cycle.

FIG. 4H shows the current consumption in the microprocessor MP2.

On these figures an alternation in the selection of the modes M2 and M3 can be distinguished. The mode M3 is primarily selected during a period of the time base signal, so as to calibrate the counting value TBVAL2. The mode M2 is then selected during N successive periods of the time base signal. Then, the mode M3 is selected again during a period of the time base signal, to re-calibrate the counting value TBVAL2 and offset any drifts of the oscillator OSC2. The mode M2 is then selected again during N periods of the time base signal, and so on and so forth.

It is assumed here that the time base circuit TBCT3 is primarily in the mode M1, at an instant t1, and that the CPU executes various programs that require its peripheral elements to be active. The oscillator OSC2 is stopped (OF2=0) and the oscillator OSC1 is active (OF1=1). The time base signal delivered by the circuit TBCT3 is the signal TBS1. The consumption of the microprocessor is maximal and is represented on FIG. 4H by a level of current consumed Imax.

It is then assumed that the CPU no longer has any tasks to be executed, other than the one that involves incrementing a timer upon each pulse of the time base signal.

Therefore, at an instant t2, the CPU sets the signal OF2 to 1 to activate the oscillator OSC2 and sets the flag CAL to 1 to prepare the calibration phase. The latter occurs at an instant t3, when the next pulse of the time base signal TBS1 occurs and the interrupt signal TBIT is emitted. The circuit TBCT3 switches into the mode M3 and the calibration of the counting value TBVAL2 proceeds as described above, without requiring the intervention of the CPU. For its part, the CPU updates the timer by incrementing it by one unit, then executes at an instant t4 the instruction "ACTIVE HALT". The CPU then switches into an active halt mode in which all the peripherals are stopped, except for the circuit TBCT3 and the clock circuit CKGEN. The current consumption drops and reaches a value Imin1, due to the consumption of the clock circuit CKGEN and the much lower consumption of the circuit TBCT3. This consumption corresponds to the consumption of the classical microprocessor described above, when it is in the active halt mode.

At an instant t5, the time base signal TBS1 has a new pulse and an interrupt signal TBIT wakes up the CPU. The CPU sets the flag CAL back to 0 and sets the flag MD to 1, to cause the circuit TBCT3 to switch into the mode M2. The CPU then updates the timer by incrementing it by one unit, then executes an instruction "ACTIVE HALT" and goes, at an instant t6, into an active halt mode. All the peripheral elements are stopped including the main oscillator OSC1 that is stopped by the control circuit CHT described above.

Therefore, the current consumption drops and reaches a value Imin2, due to the current consumption in the circuit TBCT3 and that of the auxiliary oscillator OSC2. As the consumption of the auxiliary oscillator OSC2 is much lower than that of the main oscillator OSC1, the current Imin2 is much lower than the current Imin1, for example 10 times lower.

Upon each new interruption, the oscillator OSC1 is reactivated by the circuit CHT, the CPU wakes up and updates its timer then executes the instruction "ACTIVE HALT". The consumption has a peak Imax during these operations and then goes back down to Imin2 until the next interrupt signal. The mean current consumption of the microprocessor is therefore low and is in the vicinity of Imin2, the duration of the peaks of consumption after each wake-up of the CPU being short compared with the period of the time base signal. The microprocessor according to the present invention therefore has-a low current consumption, which is not obtained to the detriment of the precision of the time base signal since the counting value TBVAL2 has been calibrated beforehand.

If no other event requires the intervention of the CPU, the latter can switch N times into the active halt mode by stopping the oscillator OSC1 each time, the periods of active halt being timed by the second time base signal TBS2 and interrupted only to allow the timer to be updated. The number N is determined according to the risks of frequency deviation of the auxiliary oscillator OSC2, and can in practice cover several hundreds of periods of the time base signal.

After the Nth period of the time base signal TBS2, the microprocessor triggers a new calibration phase of the counting value TBVAL2. For that purpose, the CPU sets the flag CAL to 1 during the Nth period of the time base signal, before switching into the active halt mode. The oscillator OSC1 then finds itself reactivated by the control circuit CHT and can stabilise itself before the next pulse of the time base signal, which marks the start of the new calibration step.

Providing cyclical recalibration has practically no repercussion on the mean current consumption, particularly when N is chosen high.

Therefore, the present invention allows the current consumption of a microprocessor in the active halt mode to be reduced to the minimum, while benefiting from an excellent precision of the time base signal.

The present invention thus allows a microprocessor to be provided comprising a time base circuit equipped with a primary clock circuit of high precision and high current consumption and with a secondary oscillator of mediocre precision and low current consumption, while keeping the cost price low. This microprocessor has the combined advantages of the two types of oscillators, that is a current consumption reduced to the minimum in active halt mode, and a high precision of the time base, while freeing oneself of the problem of loss of precision thanks to the self-calibration.

The time base generating integrated circuit according to the present invention therefore applies advantageously to the design of microprocessors requiring real time clock signals for managing timers.

It will be understood by those skilled in the art that different applications of the present invention may be made, and that generally speaking, it relates to any integrated circuit equipped with a time base circuit.

It will also be understood by those skilled in the art that various alternative embodiments of the present invention may be made.

Therefore, the countdown counter DCNT can be replaced by a counter counting the clock pulses H1 or H2 starting from 0, until the counting value TBVAL is obtained. The output of this counter is then applied to one input of a comparator receiving the value TBVAL at another input, the output of which supplies the time base signal TBS.

Furthermore, the calibrated counting value TBVAL2 calculated by means of the counter CNT can be applied to a countdown counter other than the countdown counter DCNT. This other countdown counter can directly receive the second clock signal H2 to separately produce the second time base signal TBS2, such that the multiplexer is no longer necessary.

The flags MD and CAL can also be supplied by a peripheral element other than the register TBREG.

The multiplexer circuit MUX can also be replaced by any other means for selecting one of the clock signals H1, H2.

The calibration of the value TBVAL2 can also be performed on several periods of the clock signal H1. Conversely, the clock signal applied to the counter CNT during the calibration of the value TBVAL2 can be a clock signal the frequency of which is a sub-multiple of that of the clock signal H2, for example if a frequency divider is arranged at the output of the auxiliary oscillator OSC2.

The time base signals TBS1 and TBS2 can also have non-identical periods Tb1, Tb2, insofar as the calibration of the counting value TBVAL2 guarantees that the period Tb2 remains proportional to the reference period Tb1. The signal TBS1 can for example have a period of 0.1 second and the signal TBS2 a period of 1 second, so as to reduce the number N of wake-ups of the CPU between two re-calibration phases of the value TBVAL2. In this case, the CPU increments the timer in a different way when it wakes up, depending on whether the time base circuit were in the mode M1 or in the mode M2.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

Other embodiments, alternatives and improvements could be implemented by those skilled in the art without departing from the scope of the present invention.

What is claimed is:

1. An integrated circuit comprising:
    a first clock circuit delivering a first clock signal,
    a second clock circuit delivering a second clock signal,
    a first counting circuit for delivering a time base signal using a clock signal and a counting value, and
    means for applying the first clock signal and a first counting value to the first counting circuit, so as to produce a first time base signal,
    means for calculating a second counting value equal or proportional to the number of periods of the second clock signal occurring during a determined time interval equal to a period or to a whole number of periods of the first time base signal, and
    means for producing a second time base signal using the second clock signal and the second counting value.

2. The integrated circuit according to claim 1 wherein the means for calculating the second counting value comprise a second counting circuit and means for applying the second clock signal to the second counting circuit during a determined time interval equal to a period or a whole number of periods of the first time base signal.

3. The integrated circuit according to claim 1 wherein the means for producing a second time base signal comprise:
the first counting circuit, and
means for applying the second counting value and the second clock signal to the first counting circuit, such that the first counting circuit produces the second time base signal.

4. The integrated circuit according to claim 3 wherein the first counting circuit is linked to a set point register receiving a counting value, and is arranged for automatically loading, at the end of a counting cycle of a counting value, the counting value present in the set point register.

5. The integrated circuit according to claim 4, comprising means for loading the second counting value into the set point register during the counting of the first counting value by the first counting circuit.

6. The integrated circuit according to claim 4 wherein the means for calculating the second counting value comprise a second counting circuit that is integrated into the set point register, and means for applying the second clock signal to the second counting circuit during a determined time interval equal to a period or a whole number of periods of the first time base signal, such that the second counting value is present in the set point register when the first counting circuit completes a counting cycle of the first counting value.

7. The integrated circuit according to claim 1 wherein the first counting circuit is a countdown counter.

8. The integrated circuit according to claim 1, comprising a multiplexer circuit for applying the first or the second clock signal to the first counting circuit.

9. The integrated circuit according to claim 1 wherein the time base signal supplied by the first counting circuit is applied to an interrupt decoder.

10. The integrated circuit according to claim 1, comprising a timer that is updated in real time sometimes in synchronisation with the first time base signal and other times in synchronisation with the second time base signal.

11. The integrated circuit according to claim 1, comprising an active halt mode during which certain elements of the integrated circuit are deactivated, the duration of which is sometimes controlled by the first time base signal and other times by the second time base signal.

12. The integrated circuit according to claim 1, comprising means for deactivating the first clock circuit while the second time base signal is produced.

13. The integrated circuit according to claim 1 wherein the first and the second clock circuits each comprise an oscillator, and wherein the oscillator of the second clock circuit features reduced current consumption and low precision relative to the oscillator of the first clock circuit.

14. The integrated circuit according to claim 1, comprising means for performing the following operations cyclically:

producing the first time base signal by means of the first counting circuit, by applying the first clock signal and the first counting value to the first counting circuit,
calibrating the second counting value while the first counting circuit is supplying the first time base signal, then
producing the second time base signal by means of the first counting circuit, by applying the second clock signal and the second counting value to the first counting circuit.

15. The integrated circuit according to claim 1, comprising a microprocessor central processing unit for driving the means for calculating the second counting value.

16. The integrated circuit according to claim 1, comprising:
a second counting circuit for calculating the second counting value,
a control register comprising a calibration bit, and
a logic circuit for applying the second clock signal to the second counting circuit during a determined time interval equal to a period or a whole number of periods of the first time base signal, when the calibration bit has a determined value.

17. The integrated circuit according to claim 16, comprising means for applying the first or the second clock signal to the first counting circuit depending on the value of a mode bit present in the control register.

18. An integrated circuit, comprising:
a first clock oscillator circuit producing a first clock signal;
a second clock oscillator circuit producing a second clock signal;
a first counting circuit coupled to the first clock oscillator circuit and to the second clock oscillator circuit and adapted to receive the first clock signal, the second clock signal and to output a first time base signal;
a logic circuit coupled to the first counting circuit and adapted to output a first counting value from the first time base signal;
a second counting circuit coupled to the second clock oscillator circuit and adapted to receive the second clock signal and output a second counting value; and
a counting value register adapted to receive and store the first counting value and the second counting value, the counting value register being coupled to the first counting circuit to provide either the first counting value or the second counting value to the first counting circuit.

19. The circuit according to claim 18, further including:
a multiplexer coupling the first clock signal to the first counting circuit; and
a connection of the second clock signal to the multiplexer, the multiplexer alternatively providing either the first clock signal or the second clock signal to the first counting circuit.

* * * * *